United States Patent [19]

Perra, Jr. et al.

[11] Patent Number: 4,901,095

[45] Date of Patent: Feb. 13, 1990

[54] INK JET PRINTING APPARATUS WITH ADJUSTABLE PRINT HEAD

[75] Inventors: Andrew G. Perra, Jr., North Swanzey; James M. Cheever, Keene, both of N.H.

[73] Assignee: Markem Corporation, Keene, N.H.

[21] Appl. No.: 269,402

[22] Filed: Nov. 10, 1988

[51] Int. Cl.[4] .......................... B41J 3/04; G01D 15/16; G01D 15/00

[52] U.S. Cl. .................................. 346/140 R; 346/145

[58] Field of Search ........................... 346/140 R, 145; 400/126

[56] References Cited

U.S. PATENT DOCUMENTS

| | | | |
|---|---|---|---|
| Re. 31,358 | 8/1983 | Cha | 346/140 R |
| 2,267,194 | 2/1941 | Drill . | |
| 3,853,410 | 12/1974 | Busoni . | |
| 4,035,004 | 7/1977 | Hengesbach . | |
| 4,080,607 | 3/1978 | Van Breemen | 346/145 |
| 4,198,643 | 4/1980 | Cha | 346/140 R |
| 4,215,350 | 7/1980 | Mielke et al. | 346/140 R |
| 4,378,564 | 3/1983 | Cross et al. . | |
| 4,490,731 | 12/1984 | Vaught . | |
| 4,592,495 | 6/1986 | Toda et al. . | |
| 4,667,084 | 5/1987 | Regge . | |
| 4,679,734 | 7/1987 | Mommsen et al. . | |
| 4,791,437 | 12/1988 | Accattino | 346/140 R |

OTHER PUBLICATIONS

IBM Technical Disclosure Bulletin, vol. 15, No. 9, 1973, "Adjustable Ink Jet Head Assembly", C. M. Denny, pp. 2787–2788.

*Primary Examiner*—Clifford C. Shaw
*Assistant Examiner*—Scott Rogers
*Attorney, Agent, or Firm*—Robbins & Laramie

[57] ABSTRACT

An ink jet printing apparatus comprises a print head, a reservoir, and a rigid articulated support assembly connecting the print head to the reservoir. The support assembly affords two degrees of rotational freedom for allowing adjustment of the print head relative to the reservoir, so that printing can be carried out on surfaces lying in various planes or moving in various directions without tilting the reservoir. The support assembly has an internal channel for conducting ink from the reservoir to the print head, and may be made of a thermally conductive material in order to maintain hot melt inks at the proper operating temperature using heat generated by heating elements in the reservoir and print head.

15 Claims, 9 Drawing Sheets

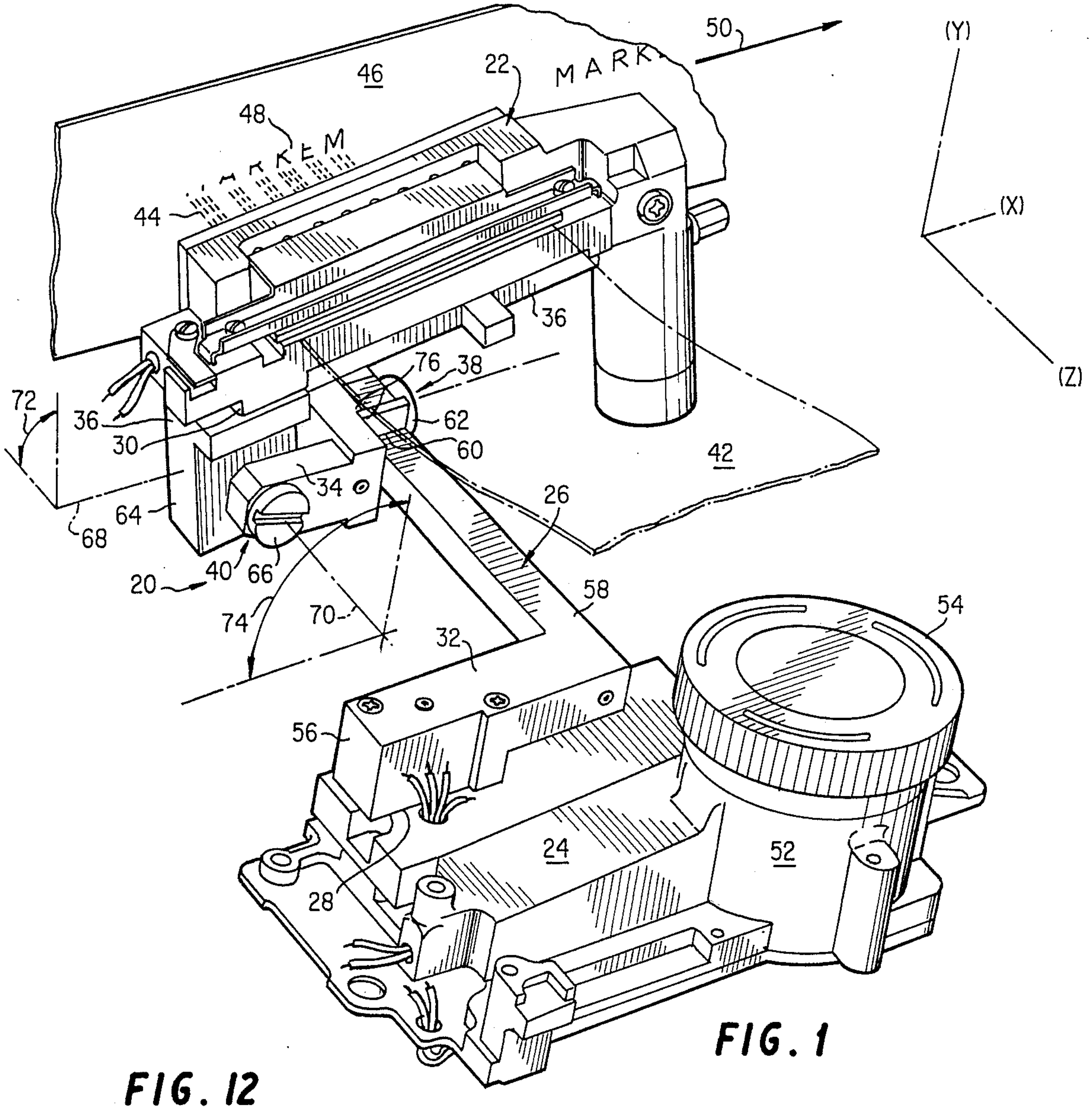
FIG. 1
FIG. 12
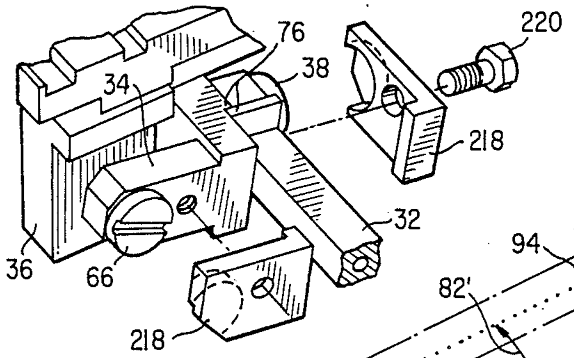
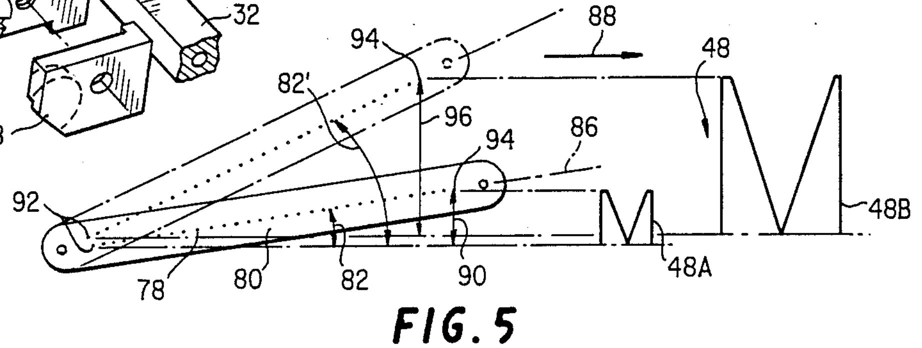
FIG. 5

FIG. 6
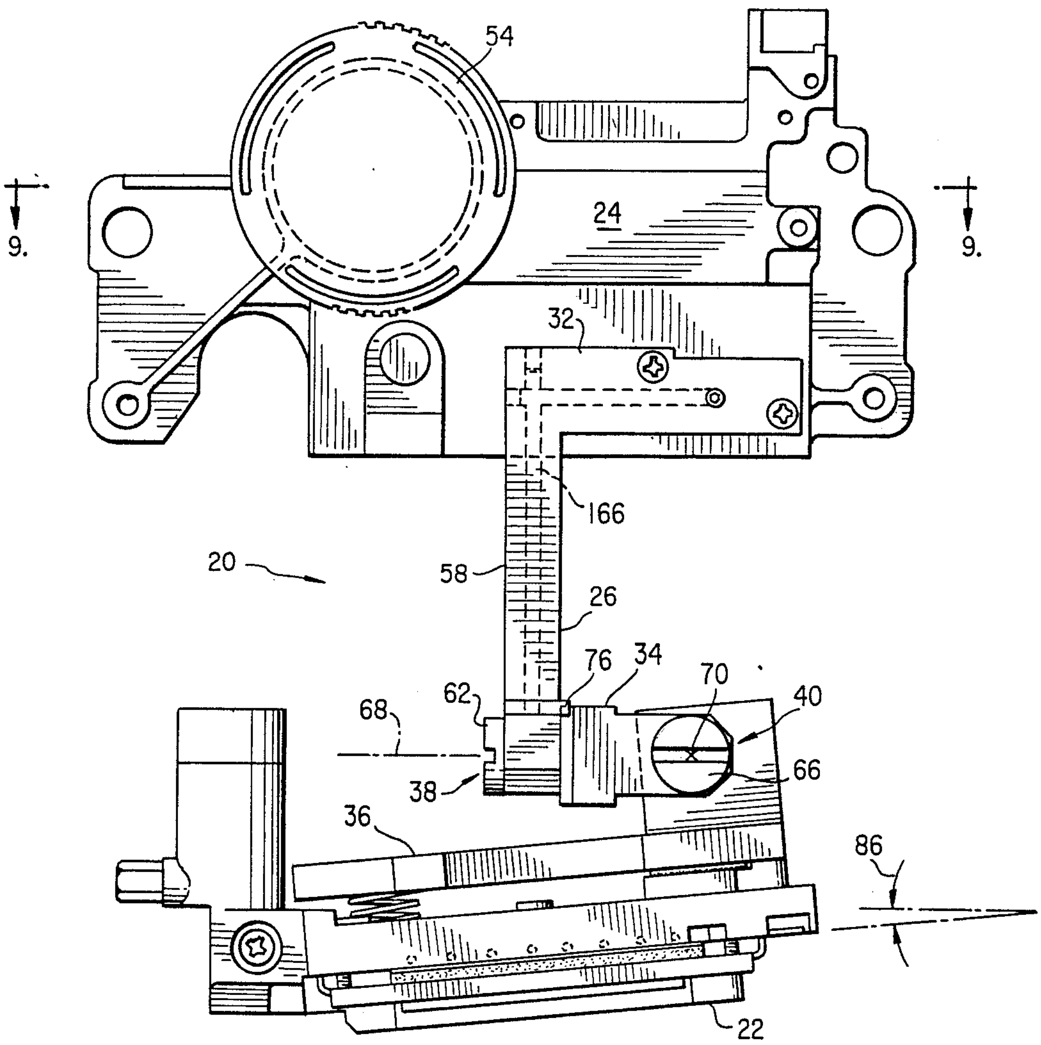
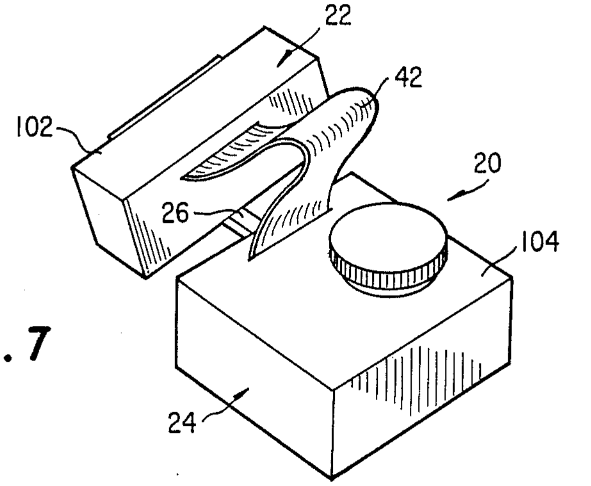
FIG. 7

INK JET PRINTING APPARATUS WITH ADJUSTABLE PRINT HEAD

BACKGROUND OF THE INVENTION

The present invention relates generally to an ink jet printing apparatus, and is specifically concerned with a hot melt ink jet printer in which an articulated arm is provided for connecting the ink reservoir to the print head so as to allow the print head to be positioned independently of the reservoir.

A conventional hot melt ink jet printing apparatus includes a heated reservoir assembly for melting a solid ink pellet and a print head for ejecting the melted ink. Normally, the print head is directly mounted to the reservoir assembly in a manner such that there is no relative movement between the reservoir assembly and print head. The print head has an array of nozzles, usually forming a straight line. When mounted on the reservoir assembly, this line of nozzles is at a slight angle with respect to the horizontal. As the object to be printed is conveyed in a horizontal direction past the print head, the nozzles are actuated in a sequential manner in order to form dot-matrix characters on the surface of the object. The angle formed by the line of nozzles relative to the horizontal defines the height of the printed characters.

Conventional hot melt ink jet printers with fixed print heads are not well suited to applications in which it is desired to print on a non-vertical surface of a horizontally moving object, or to move the object past the print head in a direction other than the horizontal. In some cases, it is possible to tip the entire ink jet apparatus so that the nozzles of the print head face the surface to be printed and line up properly with the direction of product movement. However, in instances where it is necessary to print on the top surface of the product, or where the product is being conveyed vertically during printing, this would require tipping the apparatus a full 90 degrees. Such tipping of the ink jet apparatus poses serious problems. Normally, the ink jet apparatus has one or more level sensors in the reservoir assembly for detecting when the ink is low and for shutting down the system to prevent de-priming. Tipping of the ink jet apparatus can set off these level sensors and cause a premature shutdown of the system. Furthermore, extreme tipping of the reservoir assembly can cause spillage of the ink if the print head is brought to for above or below the level of the reservoir. Such may also cause ink starvation or siphoning at the print head.

An additional disadvantage of conventional hot melt ink jet printing apparatus concerns the height of characters printed. In order to increase the printed character height, the angle formed by the array of ink jet nozzles relative to the horizontal must be increased in order to increase the effective vertical spacing between successive nozzles. However, because the print head is fixedly mounted to the reservoir assembly, the print head and reservoir must be tilted as a unit in order to achieve this result. In addition to the physical difficulty involved in repositioning the entire reservoir and print head assembly, there is the additional problem that the operation of the ink level sensors can be adversely affected whenever the orientation of the reservoir is changed. Therefore, with typical hot melt ink jet printing apparatus, only small changes in character height can ordinarily be obtained.

SUMMARY OF THE INVENTION

In accordance with the present invention, the foregoing limitations and disadvantages of the prior art are substantially avoided by providing an ink jet printing apparatus which includes an ink jet print head, a reservoir for supplying ink to the print head, and rigid articulated support means carried by the reservoir and connected to the print head. The support mean affords two degrees of rotational freedom for allowing adjustment of the print head relative to the reservoir, and includes an internal channel extending from the reservoir to the print head for conducting ink to the print head.

By virtue of the articulated support means, printing can be carried out on surfaces lying in various planes or moving in different directions, without tilting the ink reservoir. This makes it possible to avoid ink spillage and improper operation of the level sensors in the ink reservoir. Adjustment of the height of the printed characters is also facilitated.

In a specific embodiment of the invention, the articulated support means comprises at least three rigid sections and at least two rotatable joints connecting these sections. The support assembly may be made of a thermally conductive material in order to maintain hot melt ink at the proper operating temperature using heat conducted from heating elements in the reservoir and print head.

Other aspects of the present invention relate to a rotatable joint construction for use in an adjustable ink jet apparatus, and the provision of means to prevent siphoning of ink through the print head orifices, as described and claimed hereinafter.

BRIEF DESCRIPTION OF THE DRAWINGS

FIG. 1 is an upper rear perspective view of a hot melt ink jet printer constructed in accordance with the present invention shown printing on a vertical surface, with covers, circuit card and locking devices removed and with a ribbon cable shown in phantom;

FIG. 5 is a schematic illustration of the ink jet nozzles showing in exaggerated form the manner in which character height adjustments can be made;

FIG. 6 is a top plan view of the ink jet printer of FIG. 1;

FIG. 7 illustrates the ink jet printing apparatus of FIG. 1 with the reservoir and print head enclosed in separate covers with a ribbon connector therebetween;

FIG. 12 is a fragmentary view of a portion of the articulated support assembly, illustrating the locking devices used for holding the assembly in a selected position during printing;

Figure 2:
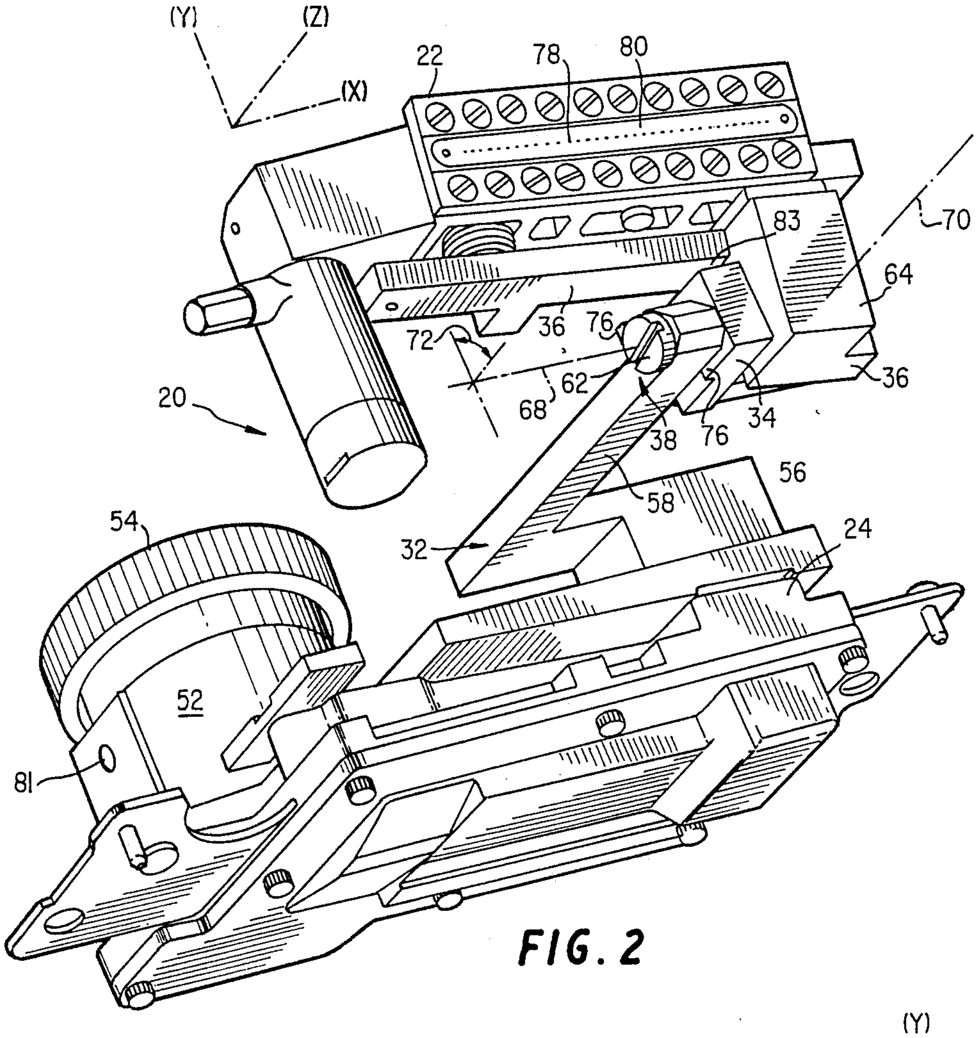
FIG. 2 is a lower front perspective view of the ink jet printer illustrated in FIG. 1, with the print head shown in a first printing position.

Although throughout the following description the terms vertical and horizontal will be used extensively, it should be understood that the invention is not limited to operation in horizontal and vertical planes.

DETAILED DESCRIPTION OF THE PREFERRED EMBODIMENT

FIG. 1 illustrates an upper rear perspective view of a hot melt ink jet printing apparatus 20 constructed in accordance with the present invention. The apparatus includes a print head 22, a reservoir 24 for supplying ink to the print head 22, and an articulated support assembly 26 connected to the reservoir 24 at one end 28 and rotatably supporting the print head 22 in an operable position at its remote end 30. The support assembly 26 has a continuous internal channel (not shown in FIG. 1) extending from the reservoir 24 to the print head 22 for carrying the ink. The support assembly 26 includes a plurality of serially interconnected, rigid sections hereinafter referred to as a pivot block support 32, joint block or elbow 34, and pivot block 36. Rotatable joints 38 and 40 connect the sections 32, 34 and 36 in series.

A ribbon cable 42, a portion of which is shown in phantom in FIG. 1, is coupled to the print head 22 for carrying electrical control signals to the individual orifices (not shown in FIG. 1). The ribbon cable 42 also contains power lines for a heating element in the print head, ground lines, and additional lines which are connected to a temperature sensor in the print head. Piezoelectric devices associated with each orifice of the print head produce droplets 44 of ink on demand, and these droplets are directed at a moving substrate 46 in a controlled fashion for producing dot-matrix characters 48. The principles of operation of the print head per se are well known in the art and need not be described further herein.

In FIG. 1, the print head 22 is shown in a first operating position for printing on a surface, such as the substrate 46, which lies in a vertical plane parallel to the face of the print head 22 and which moves horizontally in the direction of the arrow 50. The reservoir 24 is in flow communication with a melting chamber 52 which receives ink in solid form. A cover 54 protects the melting chamber from contamination.

The pivot block support 32 includes a draw end block 56 in communication with the reservoir 24. An arm 58 extends outwardly from the draw end block 56 as shown. The joint block or elbow 34 is coupled to the free end 60 of the arm 58 by means of a first pivot screw 62. The pivot block 36, which carries the print head 22, has an ink supply block 64 in communication with the print head 22 for supplying ink thereto. The ink supply block 64 is coupled to the elbow 34 by means of a second pivot screw 66.

The first pivot screw 62 defines a first pivot axis 68 which is fixed with respect to the reservoir 24 and which is parallel to the axis x of the fixed orthogonal coordinate system x, y, z shown in FIG. 1. For purposes of the description herein, the coordinate system x, y, z will be considered as being fixed relative to the reservoir 24, and hence the first pivot axis 68 will always remain parallel to the x axis.

The second pivot screw 66 is coupled to the ink supply block 64 to define a second pivot axis 70, which is movable with respect to the reservoir. In the print head position shown in FIG. 1, the second pivot axis 70 is parallel to the z axis, which is itself parallel to the arm 58. In accordance with the present invention, however, the elbow 34 is rotatable about the first pivot axis 68 through a first pivot angle 72 of about 90°. As a result, the second pivot axis 70 is rotatable from a position in alignment with the z axis as shown in FIG. 1 to a position in alignment with the y or vertical axis. A pair of confronting stops 76 on the elbow 34 and radial arm 58 limits the first pivot angle 72. The pivot block 36, pivotally mounted to the elbow 34, is movable through a second pivot angle 74 of greater than about 90 degrees. This angle extends from below the X axis to beyond the Y axis.

In FIG. 2, the ink jet printing apparatus 20 of FIG. 1 is illustrated in a lower front perspective view in the first position so that the print head 22 is arranged to print on a vertical surface (not shown) moving generally parallel to the x-y plane in the x direction. Droplets of ink are produced by orifices 78 which are formed in an orifice plate 80. In a typical application, the orifice plate 80 is spaced about one-eighth of an inch from a substrate to be printed, such as the substrate 46 shown in FIG. 1. In the print head position of FIG. 2, the droplets of ink will be projected from the orifices 78 in a direction parallel to the z axis.

An overflow orifice 81 is located in the melting chamber 52 to establish the maximum ink level in the printing system 20. A stop 83 between the elbow 34 and pivot block 36 prevents further counterclockwise rotation of the print head 22 about the pivot axis 70 beyond the position shown in FIG. 2. This maintains the orifices 78 above the overflow level so that the orifices do not release ink by siphoning action.

Figure 3:
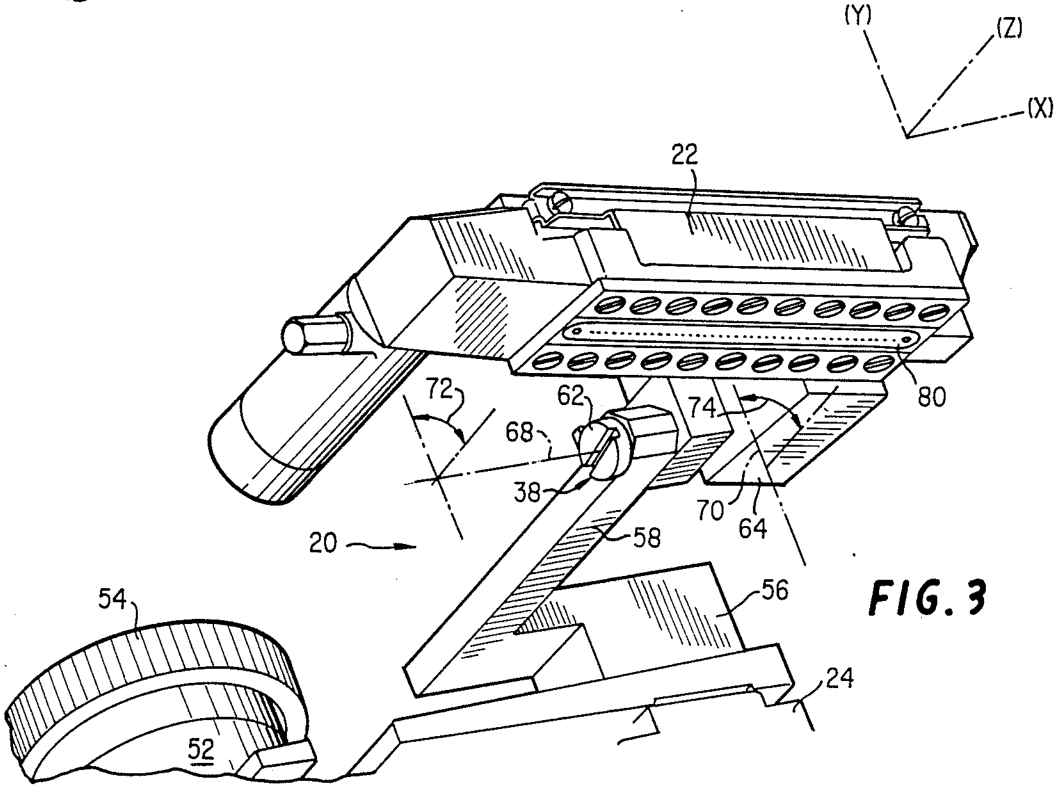
FIG. 3 is a fragmentary front perspective view of the ink jet printer of FIG. 1 with the print head moved to a second printing position.

FIG. 3 illustrates a fragmentary portion of the printing apparatus 20 of the present invention in which the print head 22 has been rotated about the fixed axis 68 so that the orifice plate 80 faces downwardly generally in the horizontal X-Z plane. In the arrangement of FIG. 3, the printing apparatus 20 is adapted to print on horizontal surfaces moving in a horizontal direction generally parallel to the x axis. The stop 76 (visible in FIGS. 1, 2, 4 and 6) prevents the print head from moving below the overflow hole 81.

Figure 4:
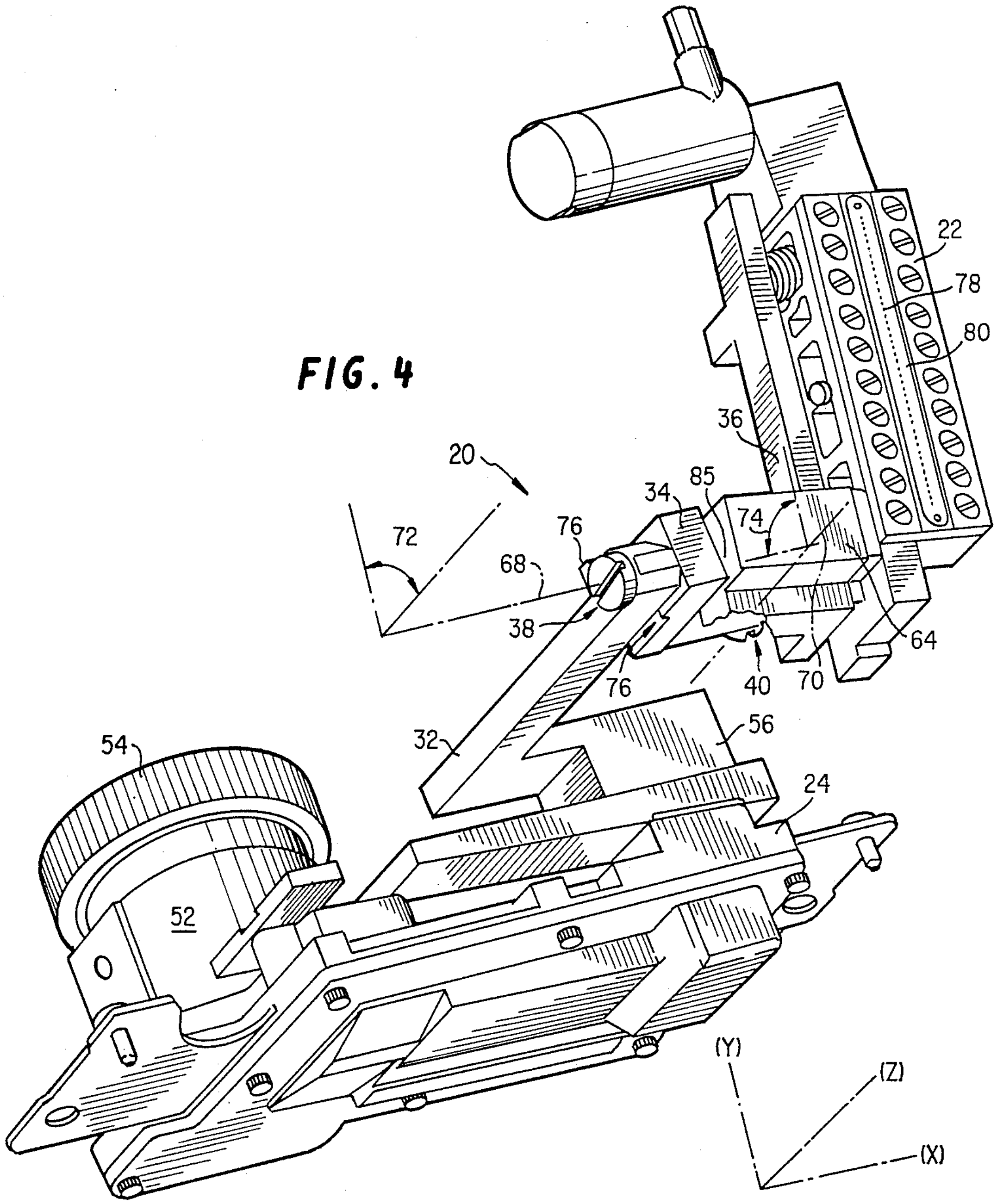
FIG. 4 is a lower front perspective view of the ink jet printer of FIG. 1 with the print head moved to a third printing position.

FIG. 4 illustrates the printing apparatus 20 of the present invention with the print head 22 moved or rotated about the second pivot axis 70 from the first position shown in FIG. 2 to the third position. The row of orifices 78 in the orifice plate 80 is aligned generally in the direction of the y axis. In the arrangement illustrated, the print head 22 is arranged to print to a surface lying in a vertical or x-y plane and moving in the vertical or y direction. Stops 85 between elbow 34 and pivot block 36 prevent the print head 22 from traveling much beyond the vertical.

It should be understood that, in accordance with the present invention, adjustment of the print head 22 to the third position may be accomplished by moving the print head from the first position (FIG. 2) directly to the third position (FIG. 4) by rotating the print head 22 about the second pivot axis 70. However, it is also possible to move the print head 22 into the third position (FIG. 4) from the second position (FIG. 3) by first rotating the print head 22 in the horizontal plane about second pivot axis 70 through the second pivot angle 74, and then rotating the print head 22 through the first pivot angle 72 about the first pivot axis 68. The print head 22 as illustrated in FIG. 3 may be moved from the second position, as shown, through any portion of the second pivot angle 74 to other orientations in the horizontal plane. It should be further understood that the invention is not limited to the three positions illustrated, and that other orientations are possible.

In accordance with the present invention, it is possible to adjust the size or height of printing characters 48 (FIG. 5) by adjusting the skew angle 82 of the print head 22. The skew angle 82 is defined as the angle between the center line 86 of the row of orifics 78 and the direction of movement 88 of the substrate (not shown). In FIG. 5, the orifice plate 80 is illustrated at a first skew angle 82 (solid lines) and at a second skew angle 82' (phantom lines). The skew angles 82 and 82' are exaggerated for purposes of illustration. In FIG. 5, the vertical distance 90 between the first orifice 92 and the last orifice 94 defines the height of the smaller character 48A. Likewise, the vertical distance 96 between the first orifice 92 and last orifice 94 at the larger skew angle 82' defines the height of the larger character 48B. In the present invention, when the print head 22 is positioned in any one of the positions shown in FIGS. 1–4, the specific skew angle may be adjusted for setting the character height. In all cases, the skew angle 82 is a lesser included angle within the second pivot angle 74.

The row of orifices 78 lie along the center line 86 which is normal to the second pivot axis 70. The droplets 44 produced by the orifices 78 (FIG. 1) are directed at the substrate 46 in a direction perpendicular to said first pivot axis 68 and parallel to the second pivot axis 70.

Referring to FIGS. 6–11, further details of the present invention will now be described. FIG. 6 illustrates in top plan view the ink jet printing apparatus 20 of the present invention with the ribbon connector removed for clarity. In this view, the print head 22, the reservoir 24 and the articulated support assembly 26 are illustrated as being in the second position, with the print head 22 facing downwardly for printing on a horizontal surface (not shown). The print head 22 lies at a skew angle 86 about the second pivot axis 70.

FIG. 7 is a simplified perspective drawing of the printing apparatus 20 of the present invention with an ink jet head cover 102 and a reservoir cover 104 in place. The ribbon cable 42 is coupled at one end to a circuit card (not shown) mounted on the reservoir 24, and at its opposite end to the print head 22. The stops 76, 83 and 85 (FIGS. 1, 2, 4 and 6) prevent full rotation of the print head 22 below the overflow level, for the reasons noted previously. Such full rotation is also prevented in order to protect the ribbon cable 42 from damage.

Figure 8:
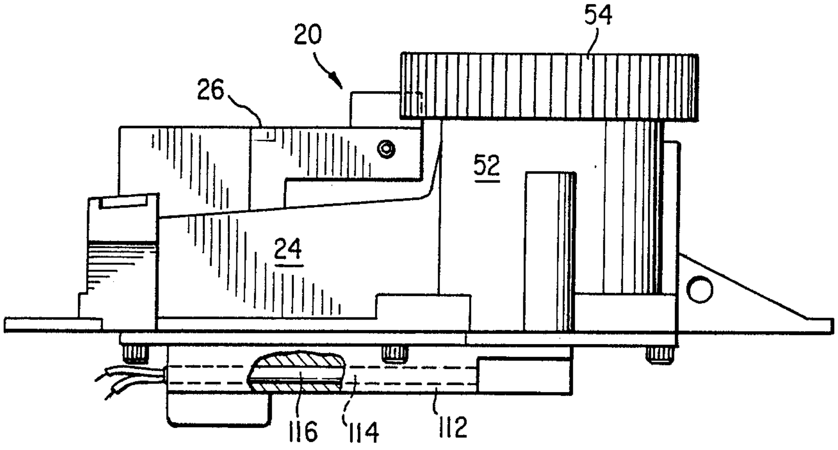
FIG. 8 is a rear elevation of the ink jet printer of FIG. 1.
Figure 10:
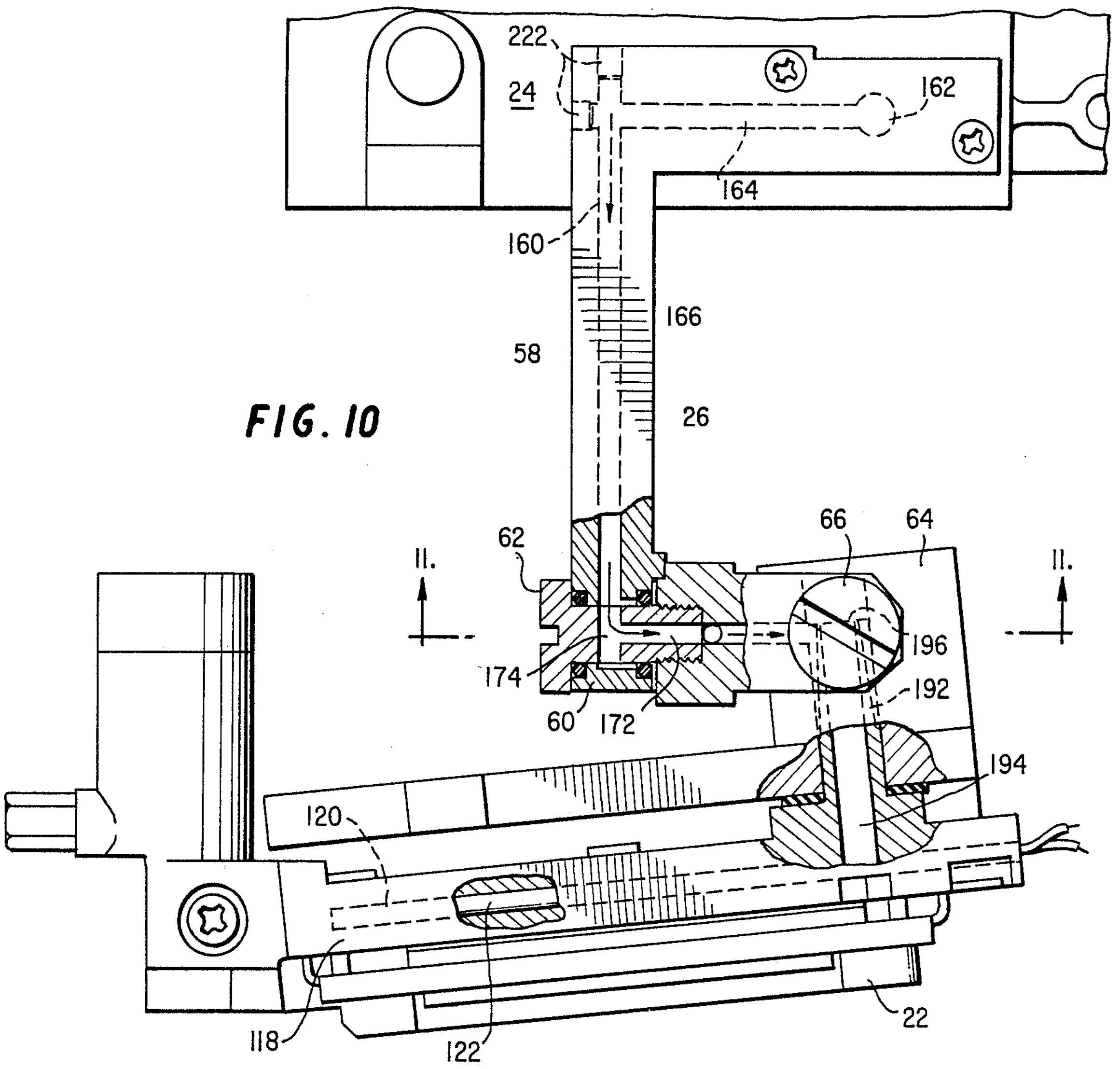
FIG. 10 is a plan view of the articulated support assembly which carries the print head, with portions shown in section to illustrate the rotatable joints and the internal ink flow channel.

FIG. 8 is a rear elevation of the printing apparatus of the present invention illustrating the reservoir 24, the melting chamber 52, and the cover 54. The lower reservoir chamber housing 112 has a cylindrical bore 114 for receiving a reservoir heating element 116. The heating element 116 maintains the reservoir 24 at the proper operating temperature for hot melt ink. Similarly, as illustrated in FIG. 10, the print head ink chamber block 118 has a cylindrical bore 120 for receiving a print head heating element 122 therein for maintaining the print head 22 at the proper operating temperature. The articulated arm 26 coupled between the print head 22 and the reservoir 24, is made of a heat conductive material, such as aluminum, and is heated by conduction from the heat supplied by the reservoir heater 116 and the print head heater 122.

Figure 9:
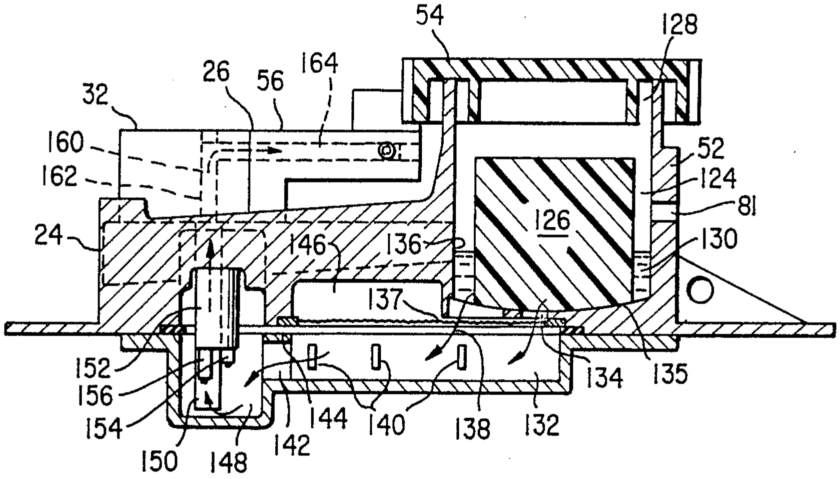
FIG. 9 is a sectional view taken along line 9—9 of FIG. 6, with a portion of the ink flow path illustrated by arrows.

In FIG. 9, the reservoir 24 is shown in a side sectional view. With the exception of the cap 54, which may be made of plastic, the reservoir 24 is made of a metal having good heat conduction properties, such as aluminum or steel. The melting chamber 52 of the reservoir has an upper reservoir chamber 124 formed therein. With the cap 54 removed, a pellet 126 of solid thermoplastic hot melt ink is supplied through the open top 128 of the melting chamber 52. The heating element 116, when actuated, supplies heat for raising the temperature of the entire reservoir 24 in order to melt the pellet 126 and thereby provide a supply of liquid ink 130 for the system. The cover 54 protects the ink 130 in the system from contamination and the overflow orifice 81 establishes an ink level below the level of the orifices 78. The upper reservoir chamber 124 is connected to a lower reservoir chamber 132 via exit ports 134 in the bottom wall 135 which extends into the side wall 136 of the chamber 124. The ink 130 flows into the lower chamber 132 through a filter 137. Ink flow, shown by the arrows 138, moves laterally in the lower chamber 132 past the baffles 140, which enhance heat exchange between the reservoir 24 and the ink 130, to the lateral exit port 142 in the end wall 144. A chamber 146 is provided above the filter 137 to allow the ink to spread across the entire top surface of the filter.

The ink flowing through the exit port 142 fills a supply chamber 148, which contains a draw tube 150. The draw tube 150 is an extension of the draw end block 56 of the pivot block support 32. The supply chamber 148 also contains a sensor element 152 which has first and second level detectors 154 and 156. The first level detector 154 senses when the ink supply 130 falls below a warning level so that a signal can be provided to the operator to add more ink. The second level detector 156 provides a system shutdown signal when the ink 130 falls below the level at which the system would lose its prime.

Figure 11:
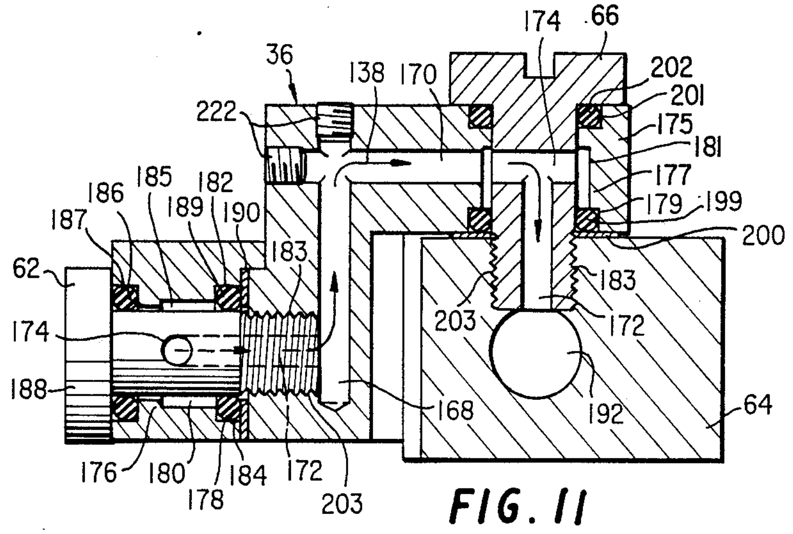
FIG. 11 is a sectional view of a portion of the articulated arm taken along line 11—11 of FIG. 10.

The ink 130 is drawn up the draw tube 150 by pumping action provided by the piezoelectric actuators within the print head 22, and passes into a continuous internal channel 160 formed in the articulated arm 26. As shown in FIGS. 9 and 10, the internal channel 160 comprises a plurality of interconnected cylindrical bores in the articulated support assembly 26. A draw channel 162 is axially aligned within the draw tube 150 (FIG. 9), and a lateral channel 164 in the draw end block 56 is in communication with the draw channel 162. The feed channel 166 formed in the arm 58 communicates with the lateral channel portion 164 and extends to the free end 60 of the arm 58. First and second pivot channels 168 and 170 are formed in the pivot block 36, as shown in FIG. 11. Each of the first and second pivot screws 62 and 66 has an axial channel 172 and a diametric channel 174 (FIGS. 10 and 11). The free end 60 of the arm 58 and the downstream end 175 of the pivot block 36 have respective stepped bores 176, 177 formed therein. Each stepped bore 176, 177 has an enlarged stepped open end 178, 179 and a stepped intermediate portion 180, 181. The upstream end 182 of the pivot block 36 has a threaded opening 183 which confronts the enlarged open end 178 of the arm 58. The first pivot screw 62 is fitted into the stepped bore 176 and is threadably secured to the pivot block 36 as shown in FIG. 11. Similarly, the supply block 64 has a threaded opening 183 which confronts the enlarged opening 179 in the downstream end 175 of the pivot block 36. The second pivot screw 66 is threadably secured to the supply block 64 through the stepped bore 179 in the downstream end 175 in pivot block 36. The enlarged open end 178 of the stepped bore 176 forms a first recess 184 around the first pivot screw 62. The intermediate portion 180 forms an annular chamber 185 around the first pivot screw 62. The annular chamber 185 communicates with the radial channel 166 in the radial arm 58 and the diametric channel 174 in the first pivot screw 62.

By virtue of the foregoing arrangement, the ink is able to flow from the feed channel 166 about the pivot screw 62 in the annular chamber 185 to the diametric channel 174 and thence to the axial channel 172. Thus, it is not necessary for the diametric channel 174 to be aligned with the feed channel 166 in order for the ink to flow. An 0-ring seal 186 is provided in second recess 187 to seal the head 188 of the pivot screw 62 against the radial arm 58. An 0-ring 189 is provided in first recess 184. A washer 190 overlying the 0-ring 189 is in confronting relation with the elbow 36 to seal the pivot block 36 against the opposite side of the arm 58 as shown in FIG. 11. The second stepped bore 177 has a structure similar to that of the first stepped bore 176, and contains similar components. The details of the second stepped bore 177 are shown in FIG. 11 but are not further discussed herein.

A supply channel 192 (FIG. 11) is formed in the ink supply block 64 for communication with a supply tube 194 (FIG. 10) in the print head 22. The supply tube 194 has a tapered tubular end 196 that is suitably sleeved in the supply channel 192. As indicated by the arrows 138, the ink flows via the first and second pivot channels 168 and 170 to the supply channel 192 via the annular chamber 181 which is in communication with the respective axial and diametric channels 172 and 174 in the second pivot screw 66. The second pivot screw 66 is suitably threaded into the threaded bore 183 in ink supply block 64. The second stepped bore 177 in elbow 36 confronts the supply block 64 as shown. The second stepped bore 177 of the second joint 40 is similar to the stepped bore 176 of the first joint 38, as previously described. The first recess 179, 0-ring 199, washer 200, intermediate chamber 181, second recess 201, and 0-ring 202 have the same functions of the corresponding parts described above.

The first and second pivot screws 62 and 66 are tightened so that the 0-rings 186, 189, 199 and 202 are sufficiently compressed to prevent leaks. The screw threads 203 of the first and second pivot screws 62 and 66 are secured in their respective bores by an appropriate adhesive such as the material sold under the trademark "Loctite".

Referring to FIG. 12, when it is desired to adjust the position of the print head 22 to any of the various positions hereinbefore described, the pivot screw locks 218 are loosened so that the various arm sections 32, 34 and 36 may move with respect to each other but remain self-supporting. When the proper adjustment is achieved, the pivot screw locks 218 may be tightened by means of hex bolts 220. Thus, the pivot screw locks 218 prevent the movement of the pivot screws 62 and 66 after the arm sections 32, 34 and 36 are fixed in position.

Referring once again to FIGS. 9–11, the various sections of the channel 160 are formed by mechanical drilling from opposite ends of a particular piece until the channels intersect and therefore communicate. Sometimes, however, as in the case with the draw channel 162, the lateral channel 164, and the feed channel 166, through-holes are drilled and the ends are closed with screw plugs 222. Screw plugs 222 are also used for reclosing the first and second pivot channels 168 and 170 as illustrated in FIG. 11.

Figure 13:
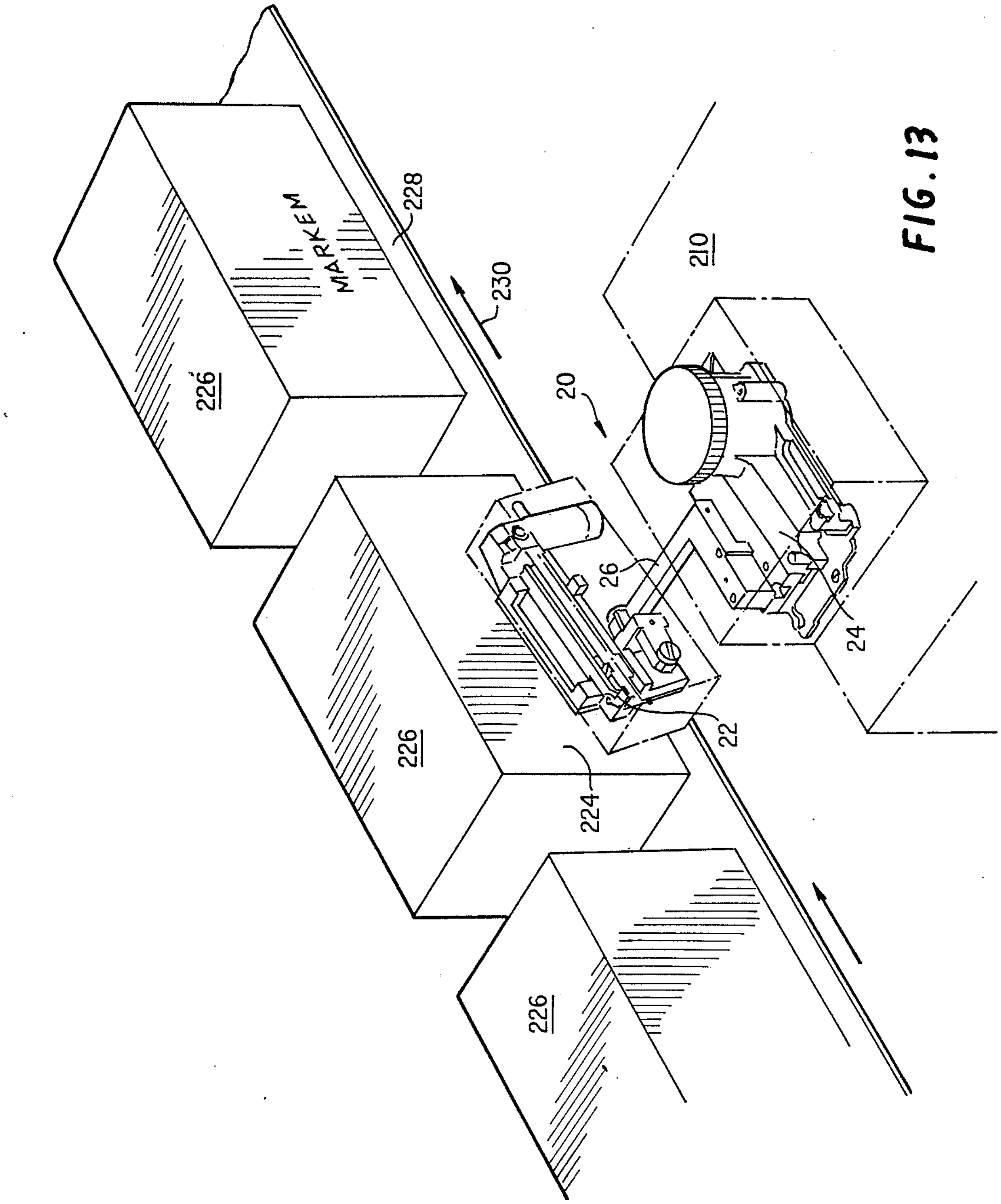
FIG. 13 is a perspective view of the ink jet printing apparatus of the present invention with the ink jet print head in the first position for printing on the vertical sides of containers moving along a conveyor in a horizontal direction.
Figure 14:
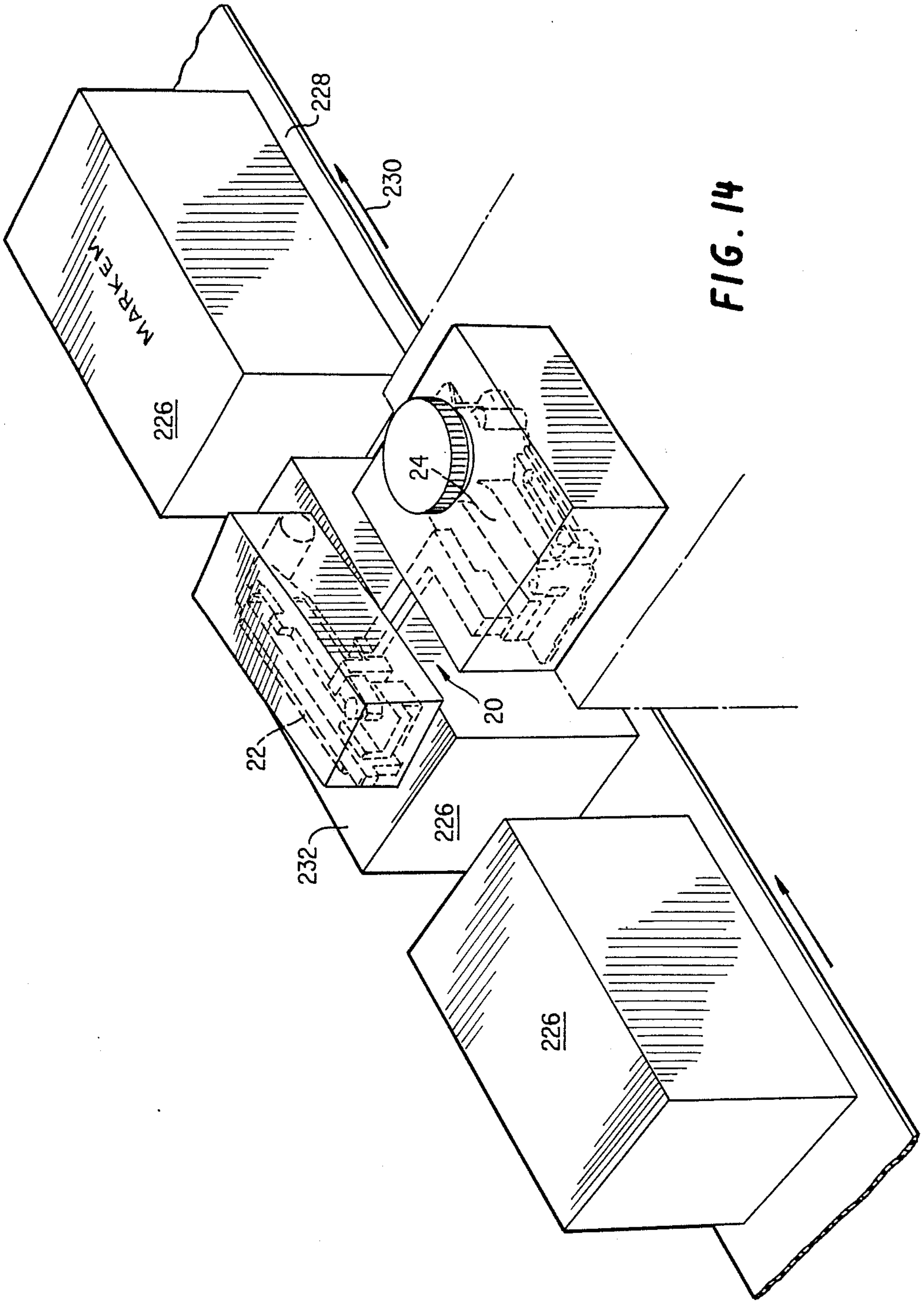
FIG. 14 is a perspective view of the ink jet printing apparatus of the present invention with the ink jet head moved to the second position for printing on the top horizontal surfaces of containers moving along a conveyor in a horizontal direction.
Figure 15:
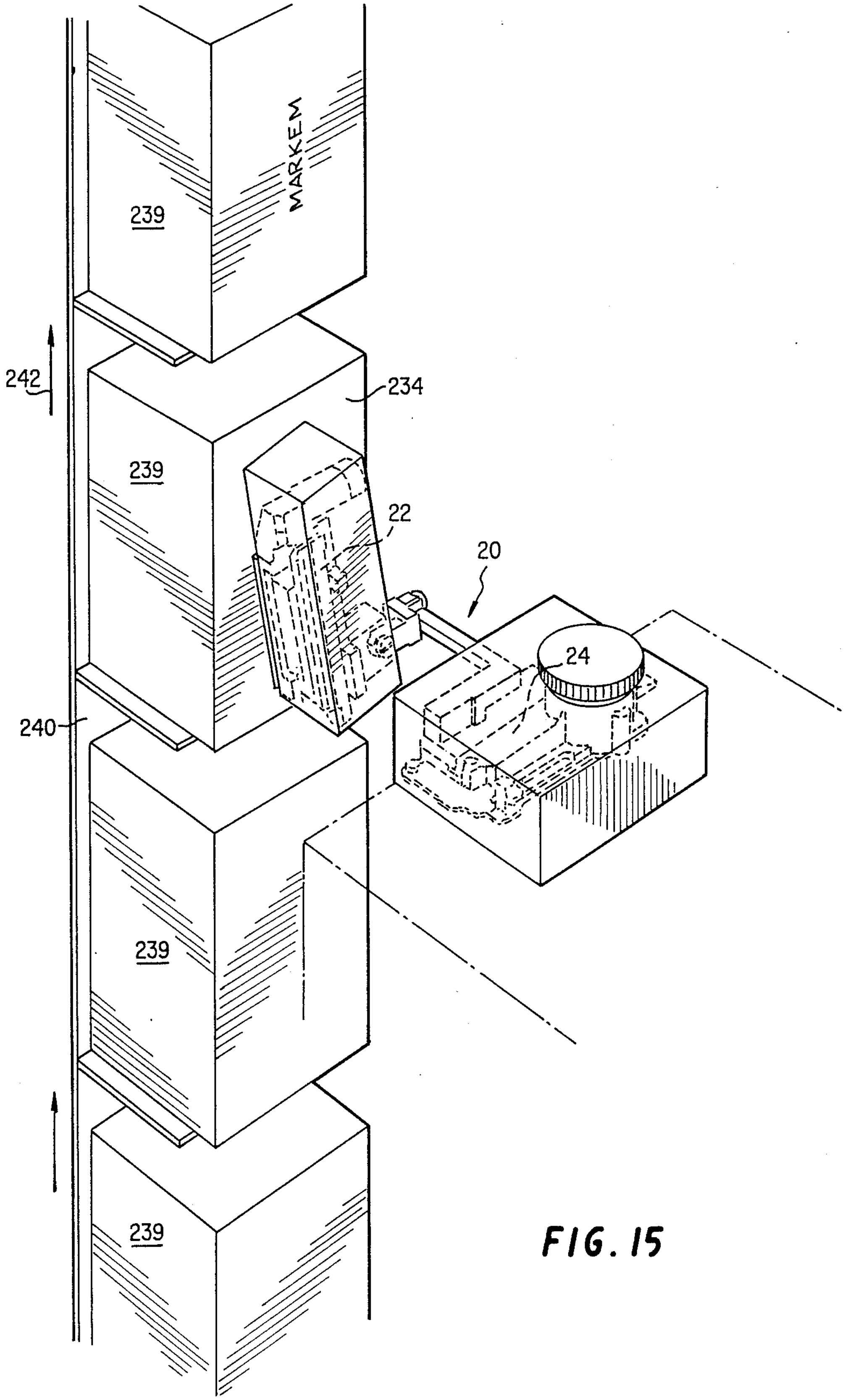
FIG. 15 is a perspective view of the ink jet printing apparatus of the present invention with the print head moved to the third position for printing on vertical surfaces of a series of containers moving on a lift in a vertical direction.

Operation of the ink jet printing apparatus of the present invention is illustrated in FIGS. 13–15. In FIG. 13, the printing apparatus 20 is shown with the print head 22 in the first position. The printing apparatus 20 is mounted on a supporting platform 210, shown in phantom. The articulated support assembly 26 coupled to the reservoir 24 supports the print head 22 in an orientation such that the ink nozzles face the vertical side surfaces 224 of the cartons 226 carried by the moving conveyor belt 228 in the direction of arrows 230. In the arrangement of FIG. 14, the printing apparatus 20 is shown with the print head 22 in the second position for printing on the top surfaces 232 of the cartons 226 carried by the conveyor 228 in the direction of arrows 230. In the arrangement of FIG. 15, the print head 22 is shown in the third position, in which printing may be carried out on the vertical surfaces 234 of cartons 239 carried by an elevator 240 moving upward in the direction of the arrows 242.

In the various arrangements illustrated in FIGS. 13–15, it may be necessary to adjust the position of the printing apparatus 20 with respect to the cartons being printed. Such adjustments may be easily accomplished by adjusting the position of the platform 210 with respect to the belts 228 or elevator 240.

While the invention has been described in connection with specific embodiments thereof, it will be understood that the invention is capable of further modifications. For example, although the preferred embodiment utilizes single-axis rotatable joints to obtain the desired articulation of the print head, other types of rotatable joints, such as ball joints and the like, may be used instead. It may also be desired to fit a second print head and articulated support assembly to the reservoir so that two different character heights can be printed simultaneously. Finally, it may be desired to provide a supplementary heating element for the articulated support assembly 26 to prevent cooling of the ink, particularly in embodiments wherein the arm 58 is made longer to extend the reach of the print head. The appended claims are intended to cover any variations, uses or adaptations of the invention following, in general, the principles of the invention, and including such departures from the present disclosure as come in known and customary practice within the art to which the invention pertains.

What is claimed is:

1. An ink jet printing apparatus comprising:

an ink jet print head;

a reservoir for supplying ink to the print head; and rigid articulated support means carried by said reservoir for supporting said print head, said support means affording two degrees of rotational freedom for allowing adjustment of the print head relative to the reservoir and having an internal channel extending from the reservoir to the print head for conducting ink to the print head.

2. The ink jet printing apparatus of claim 1, wherein said rigid articulated support means comprises at least three rigid sections and at least two rotatable joint connecting said sections, said rotatable joints providing said two degrees of rotational freedom.

3. The ink jet printing apparatus of claim 2, wherein said first and second rotatable joints define orthogonal axes of rotation.

4. The ink jet printing apparatus of claim 3, wherein said ink jet print head includes a row of ink jet orifices, and wherein the axis of rotation of at least one of said first and second rotatable joints has a fixed relationship with respect to the print head in which said axis is perpendicular to said row of orifices and parallel to the direction of ink projection through said orifices.

5. The ink jet printing apparatus of claim 1, further including means for heating the reservoir, the print head and said support means.

6. The ink jet printing apparatus of claim 5, wherein the ink is a hot melt ink and said support means is a conductor of heat to maintain the ink at a desired operating temperature.

7. The ink jet printing apparatus of claim 1, wherein the print head and reservoir are coupled by an electrical cable, and wherein said support means includes stop means for limiting the motion of the print head to prevent damage to said cable.

8. An ink jet printing apparatus comprising:

an ink jet print head;

a reservoir for supplying ink to the print head; and means including at least one rotatable joint for connecting said print head to said reservoir, said rotatable joint including an internal channel for conducting ink from the reservoir to the print head.

9. The ink jet printing apparatus of claim 8, wherein said rotatable joint comprises a pair of confronting portions having concentrically aligned openings.

10. The ink jet printing apparatus of claim 9, wherein said concentrically aligned openings comprise cylindrical recesses, at least one of which has a threaded portion, and wherein said rotatable joint further includes a bolt having an aperture forming a portion of said channel, said bolt being sleeved in one of the openings and threaded into the other.

11. The ink jet printing apparatus of claim 10, wherein a portion of the opening into which the bolt is sleeved is enlarged relative to the diameter of the bolt to form a chamber circumferentially surrounding the bolt, and wherein the aperture in the bolt has an axial portion aligned with the threaded opening and a radial portion in communication with said chamber.

12. The ink jet printing apparatus of claim 8, wherein said rotatable joint further comprises resilient sealing means for maintaining a fluid-tight connection.

13. The ink jet printing apparatus of claim 8, further comprising locking means engaging said rotatable joint in order to lock the print head in a desired position.

14. An ink jet printing apparatus comprising:

an ink jet print head having at least one ink jet orifice;

a reservoir for supplying ink to the print head; and means carried by said reservoir for movably supporting the print head relative to the reservoir, said support means including stop means for preventing the print head from being moved to a position relative to the reservoir at which siphoning of the ink would occur.

15. The ink jet printing apparatus of claim 14, wherein said reservoir has a predetermined maximum ink level, and wherein said stop means is operable to prevent said print head from being adjusted to a position at which said orifice would be lower than said predetermined maximum ink level.

* * * * *